United States Patent
Mistry et al.

(10) Patent No.: US 11,736,434 B2
(45) Date of Patent: *Aug. 22, 2023

(54) ASYNCHRONOUS EVENT-BASED DISTRIBUTED MESSAGING SERVICE

(71) Applicant: Google LLC, Mountain View, CA (US)

(72) Inventors: Shaunak Mistry, Scotts Valley, CA (US); Phillip Wayne Peralez, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,642

(22) Filed: Sep. 8, 2022

(65) Prior Publication Data
US 2023/0006963 A1    Jan. 5, 2023

Related U.S. Application Data

(63) Continuation of application No. 17/216,608, filed on Mar. 29, 2021, now Pat. No. 11,477,157.

(51) Int. Cl.
*H04L 51/52* (2022.01)

(52) U.S. Cl.
CPC .................................. *H04L 51/52* (2022.05)

(58) Field of Classification Search
CPC ....................................................... H04L 51/52
See application file for complete search history.

(56) References Cited

U.S. PATENT DOCUMENTS 8,874,667 B2   10/2014   Edwards et al.
10,908,977 B1   2/2021   Ferstay et al.
11,054,971 B2   7/2021   Zheng et al.
(Continued)

FOREIGN PATENT DOCUMENTS

WO   2020107016      5/2020
WO   2020107016 A1   5/2020
(Continued)

OTHER PUBLICATIONS

Jul. 11, 2022 Written Opinion (WO) of the International Searching Authority (ISA) and International Search Report (ISR) issued in International Application No. PCT/US2022/022102.

*Primary Examiner* — Benjamin M Thieu
(74) *Attorney, Agent, or Firm* — Honigman LLP; Brett A. Krueger

(57) ABSTRACT

When instantiating a requesting process that publishes a request for a response from a responding process, a method of implementing an event-based distributed messaging service includes identifying a response topic of a distributed messaging service and generating subscriptions for the response topic where each subscription includes a subscription identifier. During runtime for the requesting process, the method publishes a request message to a request topic subscribed to by the responding process where the request message includes a unique message identifier and generates a subscriber using a respective subscription identifier of a respective subscription selected from the subscriptions where the subscriber includes the unique message identifier. During runtime for the requesting process, the method also receives, at the subscriber, a filtered response message from the responding process where the filtered response message is filtered based on a subscription identifier associated with the subscriptions for the requesting process.

20 Claims, 8 Drawing Sheets

(56) References Cited

U.S. PATENT DOCUMENTS

| | | |
|---|---|---|
| 2005/0021622 A1 | 1/2005 | Cullen |
| 2008/0235709 A1 | 9/2008 | Roberts |
| 2017/0041352 A1 | 2/2017 | Martens et al. |
| 2018/0287969 A1 | 10/2018 | Broadhurst et al. |

FOREIGN PATENT DOCUMENTS

| | | |
|---|---|---|
| WO | 2020112793 | 6/2020 |
| WO | 2020112793 A2 | 6/2020 |

ASYNCHRONOUS EVENT-BASED DISTRIBUTED MESSAGING SERVICE

CROSS REFERENCE TO RELATED APPLICATIONS

This U.S. patent application is a continuation of, and claims priority under 35 U.S.C. § 120 from, U.S. patent application Ser. No. 17/216,608, filed on Mar. 29, 2021. The disclosure of this prior application is considered part of the disclosure of this application and is hereby incorporated by reference in its entirety.

TECHNICAL FIELD

This disclosure relates to asynchronous event-based distributed messaging service.

BACKGROUND

Distributed systems, such as cloud computing environments, are becoming more widely used to offer an array of software services. As these software services grow and businesses integrate multiple services into their workflow, the coordination between these services may become increasing critical. That is, a client's reliance on the compatibility between services demands robust communication between processes of these services. Additionally, clients prefer the robust collaboration between processes to operate in a cost efficient manner from both a computing cost as well as a financial cost. This translates to the fact that when messaging systems coordinate actions between processes, the communication between these processes should avoid wasteful and latency-inducing operations.

SUMMARY

One aspect of the disclosure provides a computer-implemented method of implementing an event-based distributed messaging service. The computer-implemented method, when executed by data processing hardware, causes the data processing hardware to perform operations. When instantiating a requesting process that publishes a request for a response from a responding process, the operations include identifying a response topic of a distributed messaging service that receives the response for the request from the responding process where the responding process is configured as a publisher for the response topic. Also when instantiating a requesting process that publishes a request for a response from a responding process, the operations include generating a plurality of subscriptions for the response topic where each subscription includes a subscription identifier. During runtime for the requesting process, the operations further include publishing a request message to a request topic subscribed to by the responding process where the request message includes a unique message identifier and generating a subscriber using a respective subscription identifier of a respective subscription selected from the plurality of subscriptions where the subscriber includes the unique message identifier. Furthermore, during runtime for the requesting process, the operations also include receiving, at the subscriber, a filtered response message from the responding process in response to the request message published to the response topic. Here, the filtered response message is filtered based on one or more subscription identifiers associated with the plurality of subscriptions for the requesting process.

Another aspect of the disclosure provides a system for implementing an event-based distributed messaging service. The system includes data processing hardware and memory hardware in communication with the data processing hardware. The memory hardware stores instructions that when executed on the data processing hardware cause the data processing hardware to perform operations. When instantiating a requesting process that publishes a request for a response from a responding process, the operations include identifying a response topic of a distributed messaging service that receives the response for the request from the responding process where the responding process is configured as a publisher for the response topic. Also when instantiating a requesting process that publishes a request for a response from a responding process, the operations include generating a plurality of subscriptions for the response topic where each subscription includes a subscription identifier. During runtime for the requesting process, the operations further include publishing a request message to a request topic subscribed to by the responding process where the request message includes a unique message identifier and generating a subscriber using a respective subscription identifier of a respective subscription selected from the plurality of subscriptions where the subscriber includes the unique message identifier. Furthermore, during runtime for the requesting process, the operations also include receiving, at the subscriber, a filtered response message from the responding process in response to the request message published to the response topic. Here, the filtered response message is filtered based on one or more subscription identifiers associated with the plurality of subscriptions for the requesting process.

Implementations of either the computer-implemented method or the system of the disclosure may include one or more of the following optional features. In some implementations, the operations also include, during runtime for the requesting process, randomly selecting the respective subscription from the plurality of subscriptions. In some examples, the operations during runtime for the requesting process further include generating the request message for the request topic. The subscription identifier may be unique among a plurality of instances of the requesting process. The subscription identifier may include a unique filter value and the filtered response message that filtered based on the unique filter value of the respective subscription used to generate the subscriber. In some examples, each respective subscriber of a respective topic of the distributed message system functions as a multicast subscription that retrieves all messages communicated on the respective topic.

In some configurations, when instantiating the requesting process that publishes a request for a response from the responding process, the operations also include storing each subscription identifier of the plurality of subscriptions for the response topic at a hash map. In these configurations, during runtime for the requesting process, the operations include randomly selecting the respective subscription identifier from the hash map storing each subscription identifier of the plurality of subscriptions for the response topic.

In some implementations, during runtime for the requesting process, the operations also include filtering one or more messages by publishers of the request topic. Here, the filtering occurs by determining whether the one or more messages by the publishers of the request topic include the unique message identifier. When a respective message of the one or more messages by the publishers of the request topic fails to include the unique message identifier, the operations include preventing the respective message from being received by the subscriber. In these implementations, the one or more messages by the publishers of the request topic include the filtered response message. When the filtered response message includes the unique message identifier, the operations, during runtime for the requesting process, additionally include generating an acknowledgement message.

Optionally, the requesting process may be instantiated in response to receiving an initial request to perform a computing task. When the requesting process is instantiated in response to receiving an initial request to perform a computing task, the operations during runtime for the requesting process further include, upon receipt of the filtered response message from the responding process in response to the request message published to the request topic, generating an initial response to the initial request to perform the computing task.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
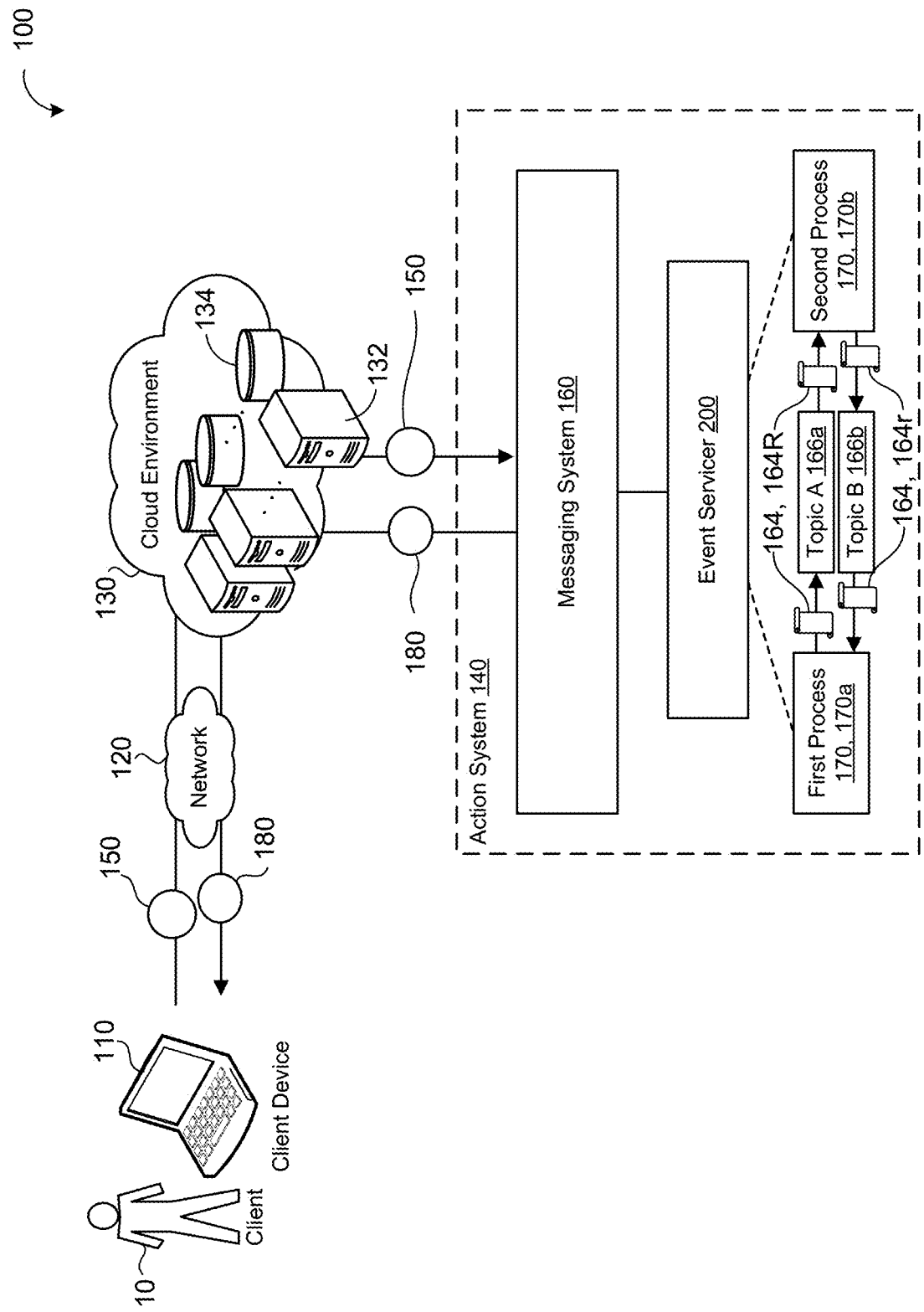
FIG. 1A is a schematic view of an example of a cloud computing environment with an event servicer.

As more businesses and individuals use distributed computing systems (i.e., cloud-based computing systems), these distributed computing systems may use some type of client-facing mechanism to perform tasks for various processes associated with one or more service offered by the distributed system. For example, a client (i.e., the businesses and/or individual users) may use an analytical platform (i.e., data analytics service) that performs data analytics on client data. An action hub that serves as a type of client-facing mechanism may be part of the analytical platform and enable the client to perform actions on the data being analyzed by the analytical platform. Here, by having a client-facing mechanism, such as an action hub, integrated with the analytical platform (e.g., a data analytics system), the client avoids having to use one system to coordinate tasks and another separate system to perform the data analytics.

Moreover, clients will often integrate a component of one software service with functionality of another software service. To continue the example of the analytical platform, a client of the action hub for the analytical platform may want to send an email to users of the client. In this example, the client may use the analytical platform to generate a visual financial report for the client based on the client's data and the client may then want to communicate that visual financial report to several users of the client (e.g., employees of a business who is the client). To produce this email of the visual financial report, the client schedules an action with the action hub where the action is to communicate the financial report as an email to the intended recipients. Action hub would generate a request to retrieve the visual financial report and, once the financial report is retrieved, the action hub would perform a triggered action to send the financial report to the intended recipients. Here, the send action is a triggered action or event-based action because the action of sending the visual financial report is triggered by the event of receiving the visual financial report in response to the retrieval request. That is, an event-based action refers to an action that occurs in response to a particular event or set of events.

One issue that arises with a client-facing mechanism like the action hub is that the tasks being coordinated through the action hub may be important or even critical workloads for the client. In other words, the client may be a business that depends on the actions being coordinated from the action hub to operate. For instance, a financial client or team of the client may rely on financial data management or financial data storage in conjunction with data analytics for that financial data. For example, a finance team at the client relies on the email that includes the visual financial report to assess financial investments. If the action hub has some failure due to workload across all clients or for some other reason, this failure can compromise client relationships and may even lead to clients controlling or hosting their own version of an action hub as a failsafe.

Failure may happen for various reasons, but one issue that may lead to failures is the way events are coordinated to perform a particular task. To coordinate a particular set of events that enable the task to occur, a client-facing mechanism, such as the action hub, employs a distributed messaging system. A distributed messaging system allows messages to be published about a particular topic and for subscribers of that topic to receive the messages published about that topic. A topic generally refers to a named resource configured by the distributed messaging system for a publication-subscription relationship. In this sense, a client-facing mechanism like the action hub operates in conjunction with the distributed messaging system to request that a particular action is performed and to communicate when that particular action has been performed.

To illustrate with the email of the visual financial report, the action hub uses the distributed messaging system to generate a request message for the retrieval of the visual financial report for the topic of retrieving visual financial reports. A subscriber of that topic may be an application or service that either generates or is capable of retrieving the visual financial report. The subscriber may then function as a publisher to generate a message that includes the visual financial report and to publish that message to a topic of retrieved visual financial reports. The action hub may then use the distributed messaging system to generate a request message to send the report as an email to a topic of generating emails. A subscriber of the topic of generating emails may receive the request message with the visual financial report and use an email service or email application to send the visual financial report to the intended recipients. When the action of sending the email has been performed, that subscriber then operates as a publisher to publish a response message to a topic of communicated emails that communicates that the email with the report has been sent. A subscriber of the topic of communicated emails receives the response message. At this stage, the action hub may indicate that the action of emailing the visual financial report to the designated recipients is complete and no further action may be taken for the task.

Although this messaging sequence appears successful for the client's action, scaling this process may become problematic. For instance, in a publisher-subscriber messaging system, a subscriber generally does not solely receive the relevant message related to the client's action, but rather a subscriber subscribes to a topic and is configured to receive all messages for that particular topic. With a publisher-subscriber system, the distributed messaging system may push messages to a subscriber when messages are received on a particular topic to which the subscriber subscribes or the subscriber may pull (i.e., retrieve) messages from a topic to which the subscriber subscribes on its own accord. Yet unfortunately in either scenario, the subscriber receives a message on a topic and often has no understanding of the context of the message prior to receipt (other than the general context that the message relates to the topic). In a system of scale when multiple publishers (e.g., thousands of publishers) generate different messages related to a myriad of actions, for a subscriber to identify a particular message becomes cumbersome and leads to a large amount of data egress. For example, in the case of the report email, the final subscriber to the topic of communicated emails is waiting for a publisher associated with an action container to indicate that the email with the visual financial report has been sent. Yet the topic of communicated emails may receive thousands of messages regarding email communication and the final subscriber is left trying to identify if any of these thousands of messages relate particularly to the email of the visual financial report.

One approach to attempting to identify if any of these thousands of messages relate to the email of visual financial report is for the final subscriber to pull all messages received on the topic and to sift through the one thousand messages until the final subscriber identifies the single message of interest. This process generates a large amount of data egress because the distributed messaging system, in the case of one thousand messages, has to transmit an additional nine-hundred and ninety-nine extra messages to the subscriber; generating additional computing costs and having the potential to trigger false events during the process. Also as businesses themselves, cloud service providers typically charge the client for data egress making this process costly for each party involved.

To extend this example further, there may be multiple subscribers for a topic and each subscriber may be trying to identify a message that confirms an action has been completed. Therefore, instead of a single subscriber having nine-hundred and ninety-nine extra messages, the egress becomes multiplied across all the subscribers. That is, with one hundred subscribers, these one hundred subscribers are receiving a total of 99,900 additional message because each of the one hundred subscribers is interested in a single message. Moreover, distributed computing infrastructure providers generally have rate limits that limit the rate of requests for a particular call. That is, the cloud provider may have a rate limit of two-hundred request per second per call, which would cause the subscriber to wait 5 seconds in response to a call to generate the one thousand requests for the one thousand messages on the topic. With rate limits, clients may be forced to experience high latency especially in regard to actions with multiple events (e.g., multiple subscription calls).

One approach to overcome these egress issues is to generate a filter or unique request identifier each time a particular action request occurs. This would mean that a request to generate an email of the visual financial report would cause an instance to be created with a unique request identifier for that particular action. This instance would generate a subscription to the necessary topics for the action to be performed, but the subscription would include the unique request identifier as a means of filtering response messages to prevent the potential of a large amount of egress. Although this approach may reduce egress, this approach also generates unique instances that cannot be leveraged by the system for other tasks. In other words, with the unique request identifier, the instance is completely unique to the request and cannot reuse its structure for any other requests. Unfortunately, the financial team at the client may generate the email of the visual financial report weekly because the report may be dynamic and an instance generated by the system for one week with a unique request identifier is unable to be used again the following week. In other words, this unique request identifier approach results in potentially frequent instantiation by the system.

To address these egress issues while also being conscientious of instantiation, the approach described herein changes the way a process is instantiated such that the instantiation of the process includes filters, but the filters that are not unique to a particular action request. Rather, during instantiation for a process, the system generates N number of subscriptions to a topic for the process where each subscription includes a unique value (e.g., unique filter value). Instead of tying these unique values to a particular request during creation (i.e., instantiation of the process) and thereby generating limited purpose subscriptions, the system generates subscribers based on these subscriptions when the system receives an action request. That is during runtime following instantiation of the process with the N subscriptions, the system receives a request for the process and creates a subscriber that uses a unique value associated with a particular subscription that was previously instantiated. In this sense, the unique value functions as a filter for the particular request, but the creation of this filter does not restrict the subscription to that particular request. This means that, for a first request, the system may create a subscriber based on an instantiated subscription by using the unique value of the instantiated subscription, but, when a second request occurs in the future, another subscriber may be generated that uses the same unique value of the instantiated subscription for its filter. Therefore, when the first request is complete, the subscriber specific to the first request may be obsolete, but the value serving as its filter value may be used for some later request on the process. Furthermore, by instantiating N number of subscriptions, the process may be scaled to operate N number of simultaneous requests. For example, each simultaneous request is able to use one of the N subscriptions' unique value to form a subscriber.

FIG. 1A is an example of a cloud computing environment 100. The environment 100 includes one or more clients 10 who communicate via a network 120 with a remote system 130. The clients 10 communicate with the remote system 130 to access and to execute various computing platforms. In other words, a remote system 130, such as a cloud computing environment, may offer various software as a service (SaaS) platforms where customers of the cloud environment 130 are the clients 10. In this respect, a client 10 may range from being a business or enterprise to an individual user of the cloud environment 130.

The client 10 may generally refer to any user of the remote system 130. The client 10 communicates with the remote system 130 using a client device 110 that may correspond to any computing device associated with the client 10. Some examples of client devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The remote system 130 may include remote resources, such as remote data processing hardware 132 (e.g., remote servers or CPUs) and/or remote memory hardware 134 (e.g., remote databases or other storage hardware). The client device 110 may utilize the remote resources to perform various functionality related to processes of services of the remote system 130. These processes may be hosted by the remote system 130 or integrate with local resources of the client device 110.

The client 10 (e.g., via the client device 110) interacts with an action system 140 (e.g., also referred to as an action hub 140) to have the action hub 140 perform a particular action submitted by the client 10 as an action request 150. Here, an action may refer to any computing task utilizing some functionality of the various services associated with the remote system 130. Often, a client 110 may generate an action request 150 to have client data that has been processed or analyzed by a particular service of the remote system 130 be integrated or used by another service. For example, the client 110 requests an action 150 to use an email service to send an email that includes the financial report about the client data that has been generated by an analytical service of the remote system 130.

Once the action associated with the action request 150 has been completed or attempted to be completed, the action hub 140 may generate a response 180 to inform the client 10 (e.g., client device 110) of the status for the action from the action request 150. When the response 180 is that the action has been completed (e.g., a response message 164 indicates that a process 170 has performed the action), the action hub 140 may communicate an actual message or some other form of communication to the client 10 to indicate completion of the action. In some examples, the action hub 140 displays that the action has been completed as a status for the action in a client-facing interface. In some configurations, the request 150 and/or the response 180 are messages using Hypertext Transfer Protocol Secure (HTTPS) or Hypertext Transfer Protocol (HTTP).

As shown in FIG. 1A, the action hub 140 may be associated with or include a messaging system 160 and an event servicer 200. The action hub 140 is shown as a dotted box around the messaging system 160 and the event servicer 200 because these components may be part of the action hub 140 itself or separate from, yet in communication, with the action hub 140. Here, the messaging system 160 may refer to a distributed messaging system that operates by coordinating asynchronous events. Here, asynchronous refers to the fact that the events do not have to be concurrently occurring. The same is generally true about asynchronous messaging. Messages may be exchanged between, for example, two processes (e.g., the first process 170, 170a and the second process 170, 170b) without the need for a current conversation (i.e., direct contact) to be taking place between the processes 170.

If the request 150 was to send an email with the visual financial report and the visual financial report was already obtained, the events to fulfill that request would be to communicate a request to some service capable of sending the email and to solicit a response that the action has been completed. Here, the service capable of performing an action is generally referred to as an action container. An action container refers to an instance of a process 170 that is capable of performing the designated action. A distributed system often may prefer to use an action container because the action container may be contained (i.e., isolated) in the distributed system such that operations performed in the action container do not unnecessarily impact other services or workloads of the distributed system. In this sense, an action container may contain an instance of a particular service or application such that the remote system 130 may scale the number of instances to accommodate for the current workload or anticipated workload on resources of the remote system 130.

When using action containers to perform some or all of a particular action, the action hub 140 generally is not able to know whether the requested action 150 has been performed unless there is some feedback that the action has been processed. That is to say that the process 170 in the action container may perform the designated action, but the action hub 140, without more information, is unaware of the process's performance. In this respect, the process 170 also leverages the messaging system 160 to communicate that the action is complete.

In some examples, to function asynchronously, the messaging system 160 operates in a publisher-subscriber configuration. A publisher-subscriber configuration is such that certain processes 170 function as publishers 162 who publish a message 164 on a particular topic 166 while a subscriber 168 of that topic 166 has a subscription to the topic 166 that makes it aware that a message 164 has been generated on the topic 166. For example, the messaging system 160 configures topics 166 where each topic 166 includes a storage space where messages 164 are stored on that particular topic 166. When a subscriber 168 receives an indication that there is a message 164 on the topic 166 to which it subscribes, the subscriber 168 may retrieve (e.g., pull) the message 164 from the corresponding storage location. In some implementations, the messaging system 160 is configured to push messages 164 on one or more topics 166 to the subscribers 168 of that topic 166 such that when a message 164 about a topic 166 is received, the messaging system 160 communicates that message 164 to all subscribers 168 who have subscriptions to that topic 166. The publisher-subscriber relationship may be one to many, meaning that one publisher 162 publishes a message 164 about a topic 166 to which multiple subscribes 168 subscribe, many to one, meaning that multiple publishers 162 publish a message 164 about a topic 166 to one subscriber 168, or some variation thereof. Moreover, with this form of distributed messaging, the number of publishers 162 and/or subscribers 168 for a given topic 166 may dynamically change based on the messaging needs of the distributed system. What this means is that the remote system 130 may instantiate multiple instances of action containers of a process 170 that generates emails.

In a publisher-subscriber model, a process 170 that has been instantiated may be a publisher 162, a subscriber 168, or both. For instance, the process 170 is a publisher 162 to a first topic 166, 166a and a subscriber 168 to a second topic 166, 166b. That means that the process 170 may generate one or more messages 164 about the first topic 166a and listen to/receive one or more messages 164 about a second topic 166b. To illustrate, a process 170 contained in an instance of an application container may be a subscriber 168 for a first topic 166a that would inform the process 170 as to actions that the process 170 has been requested to perform and also be a publisher 162 for a second topic 166b that functions as a topic to indicate that the requested action has been performed. In the email example, the process 170 is an email application capable of generating an email that attaches the visual financial report. The email application is a subscriber 168 to a first topic 166a for email requests and functions as a publisher 162 to a second topic 166b about communicated emails.

Figure 1B:
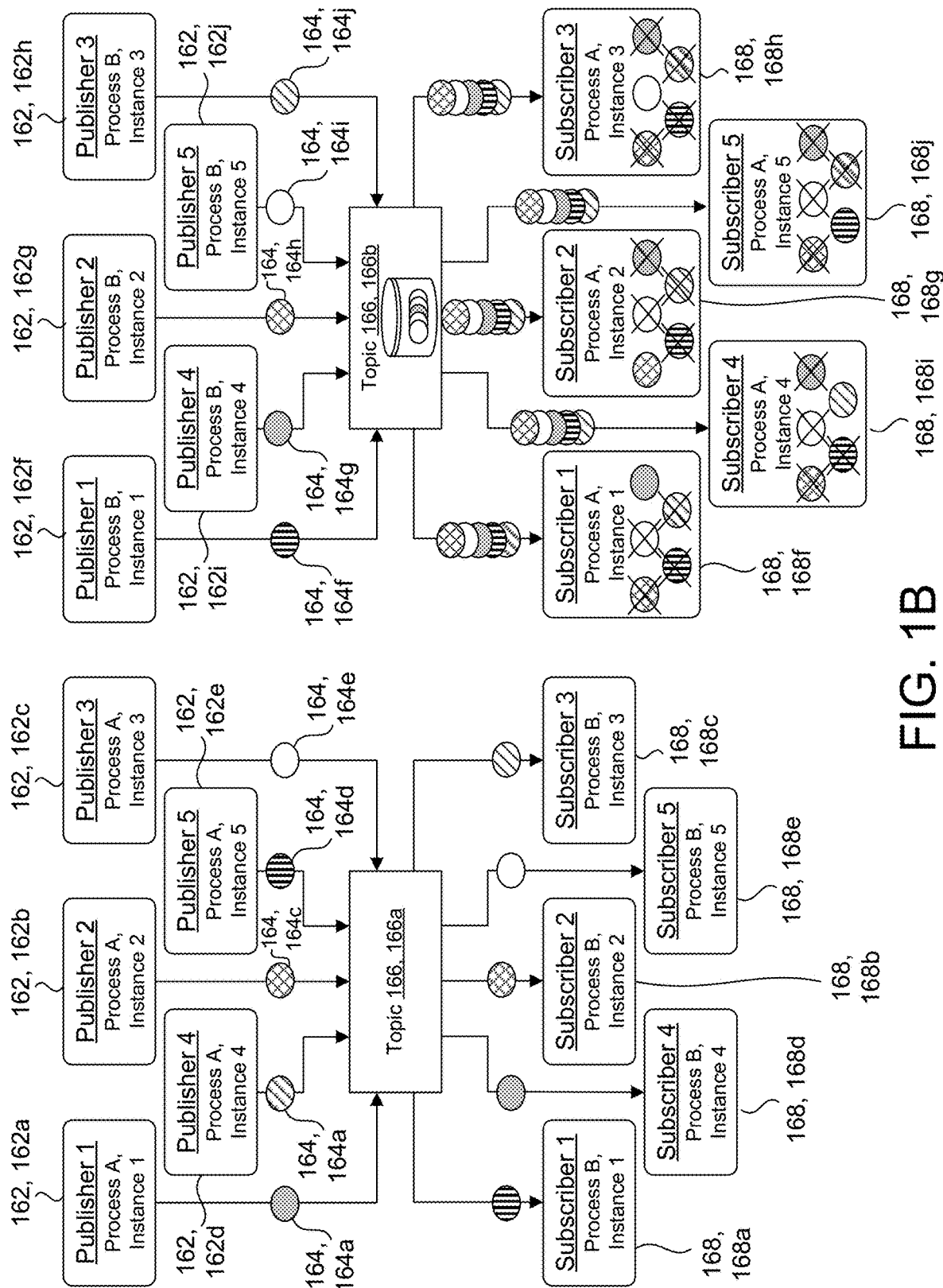
FIG. 1B is a flow diagram of an example of data egress for a multi-instance publisher-subscription system.

The event servicer 200 is a system that is configured to prevent large amounts of data egress when performing actions using the remote system 130. FIG. 1B illustrates how data egress may occur when using a publisher-subscriber messaging system 160. In this illustration, both process A and process B have been instantiated five times. Each instance of process A has been configured as a publisher 162, 162a-e to a first topic 166a and a subscriber 168, 168f-j of a second topic 166b. Although the topics 166 will vary based on the action involved, to maintain the ongoing example, the first topic 166a is a topic 166 for email requests and the second topic 166b is for communicated emails. In complimentary fashion, each instance of process B has been configured as a subscriber 168a-e on the first topic 166a and a publisher 162a-e for the second topic 166b. Each instance of process A generates a message request 164, 164a-e as a publisher 162 that requests a particular action be performed by process B. Here, each message request 164 is unique to the particular instance of process A. For example, process B may be an email application and each message request 164 requests process B to generate an email with different parameters (e.g., content, recipient, attachments, etc.). Each message 164 is shown to be unique by the different fill patterns within the circle element designated as the message request 164. In this example, the grey-filled message request 164, 164a (or first message request 164a) from the first instance of process A is the request for process B to generate the email with the visual financial report. Each instance of process B, as a subscriber 168, receives a message request 164 about the first topic 166a. When an instance of process B receives the message request 164, it performs the respective action requested in the message 164. Once each instance of process B communicates a parameterized email as requested, each instance of process B publishes a response message 164f-j as a publisher 162f-j about the second topic 166b (i.e., that the respective email has been sent). Each instance of process A also subscribes as a subscriber 168f-j to the second topic 166b about email communications such that each instance of process A is able to understand when the requested email has been sent.

As previously discussed, a subscriber 168 to a topic 166, without any additional systems, is traditionally unable to tell the content of a message 164 on a topic 166. In this respect, FIG. 1B depicts each instance of process A as pulling all response messages 164f-j from the storage location for the second topic 166b. Here, for the first instance of process A to determine that the email has been generated with the visual financial report (i.e., the first message 164a), the first instance of process A receives all the response messages 164f-j and determines that the response message 164g provides confirmation that the email has been generated with the visual financial report. To perform this determination, the first instance of process A receives and then discards or disregards the other response messages 164f,h,-j pulled from the second topic 166b. In this example, egress occurs because only a single message 164 was needed for confirmation, but the first subscriber 168f had to pull five messages 164 in order to identify the actual message 164 of interest (i.e., message 164g).

Figure 1C:
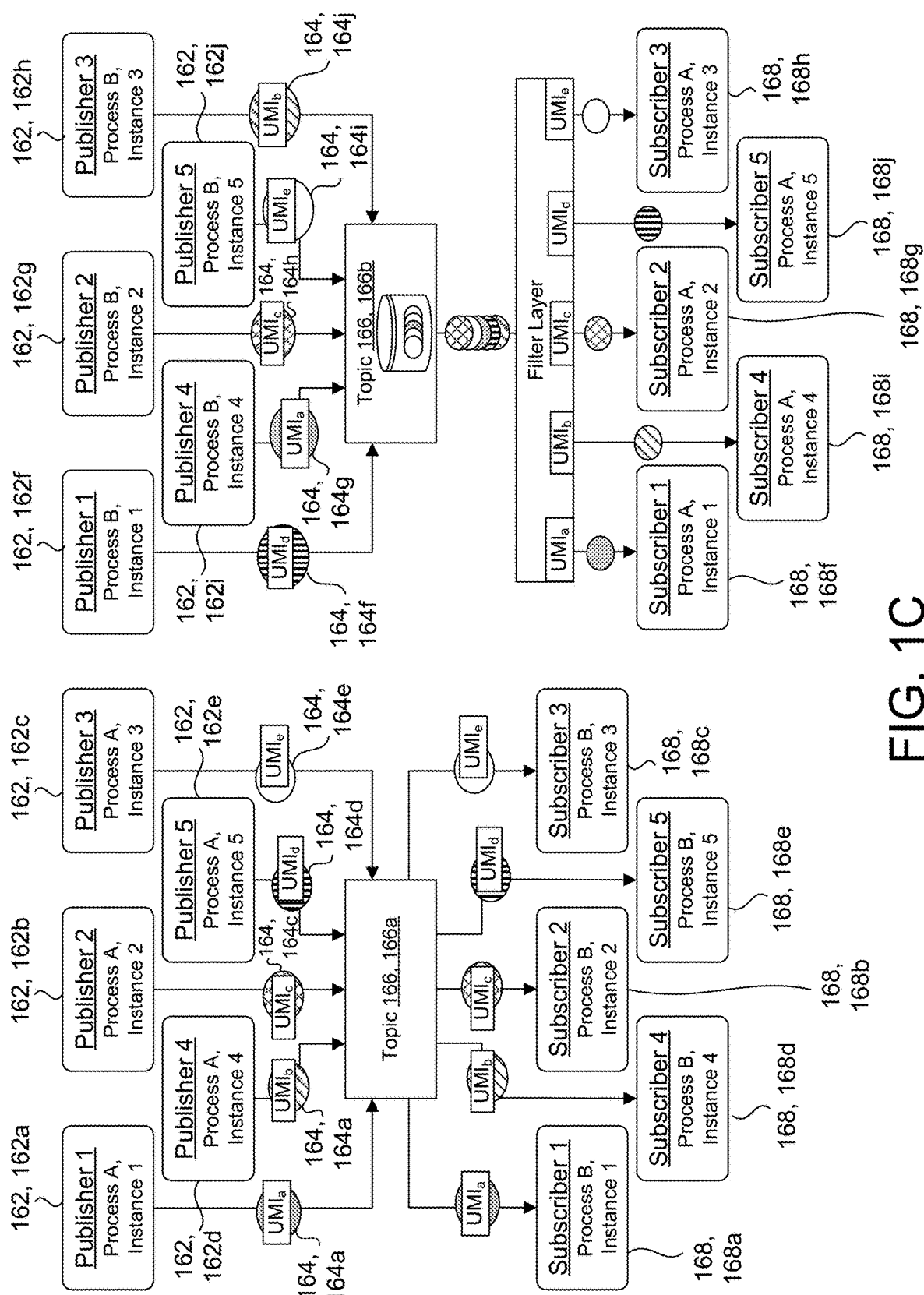
FIG. 1C is a flow diagram of an example of preventing data egress for a multi-instance publisher-subscription system using the event servicer.

In contrast, FIG. 1C depicts how the event service 200 avoids the issue of data egress. FIG. 1C is similar to FIG. 1B except that the response messages 164f-j are filtered (e.g., shown as a filter layer). That is, the subscriber 168 of the second topic 166b for each instance of process A that is awaiting the response message 164 from process B that its respective action has been performed does not have to pull all of the response messages 164f-j. Rather, the response messages 164f-j are filtered based on a unique message identifier UMI that is included in each original request message 164a-e published by process A. By filtering the response messages 164f-j, each subscriber 168f-j associated with an instance of process A receives messages 164 that are pertinent to that particular instance of process A. In this example, with only one response message 164 being pertinent to each instance of process A, each subscriber 168 of process A receives a single response message 168 (e.g., that indicates the action of the request message 164 has been completed by process B).

With continued reference to FIG. 1A, the event servicer 200 is configured to instantiate a process 170 and to setup the publisher 162/subscriber 168 relationships to perform a particular action. To setup the publisher 162/subscriber 168 relationships, the event servicer 200 is able to identify the topics 166 of interest that will be involved for a particular process 170. For example, FIG. 1A depicts a first process 170a and a second process 170b. The first process 170a is shown as a publisher 162 that generates a request message 164, 164R on the first topic 166a while the second process 170b is a subscriber 168 of the first topic 166a and receives the request message 164R. The second process 170b then functions as a publisher 162 for the second topic 166b by generating a response message 164, 164r in response to the request message 164R. The first process 170a is a subscriber of the second topic 166b to receive the response message 164r that informs the first process 170a of the action associated with the request message 164R.

Figure 2A:
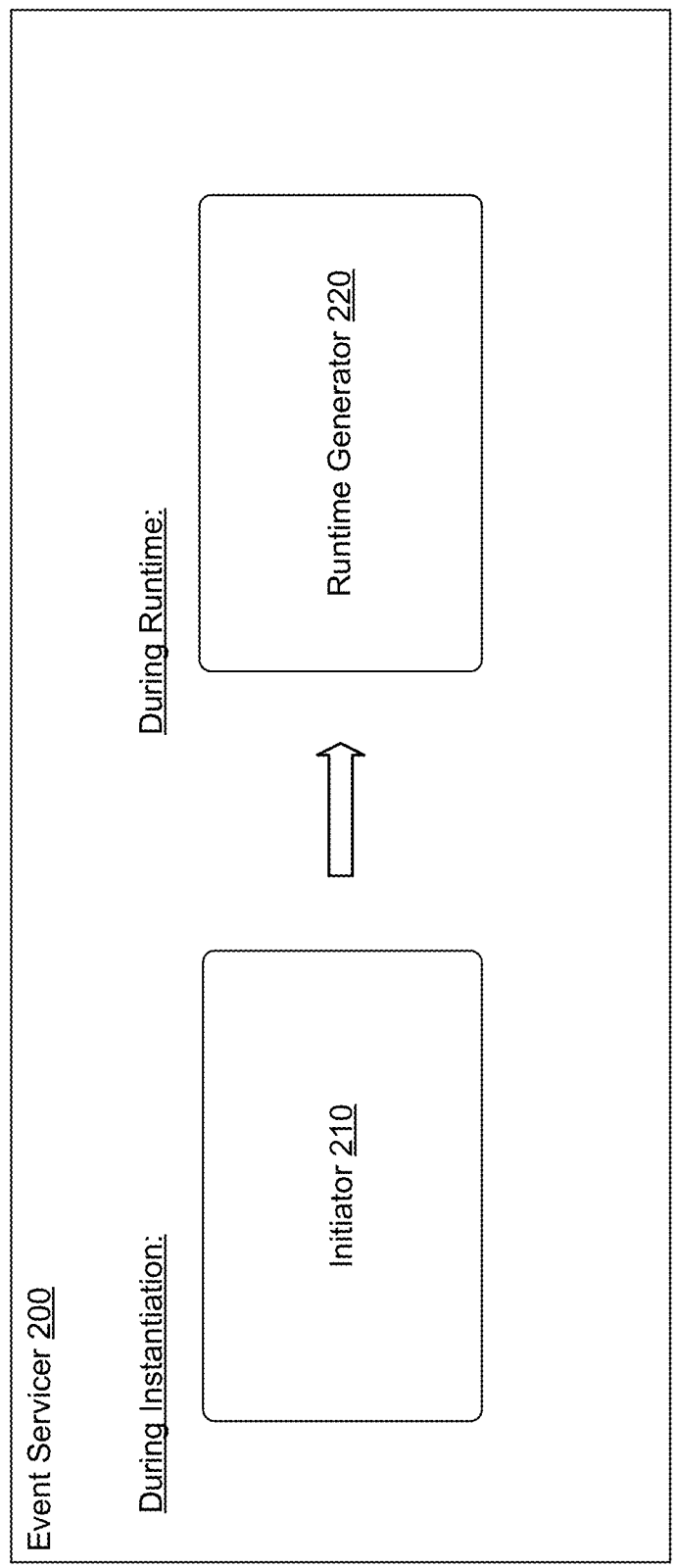
FIGS. 2A-2C are schematic views of examples of an event servicer of the cloud computing environment of FIG. 1A.
Figure 2B:
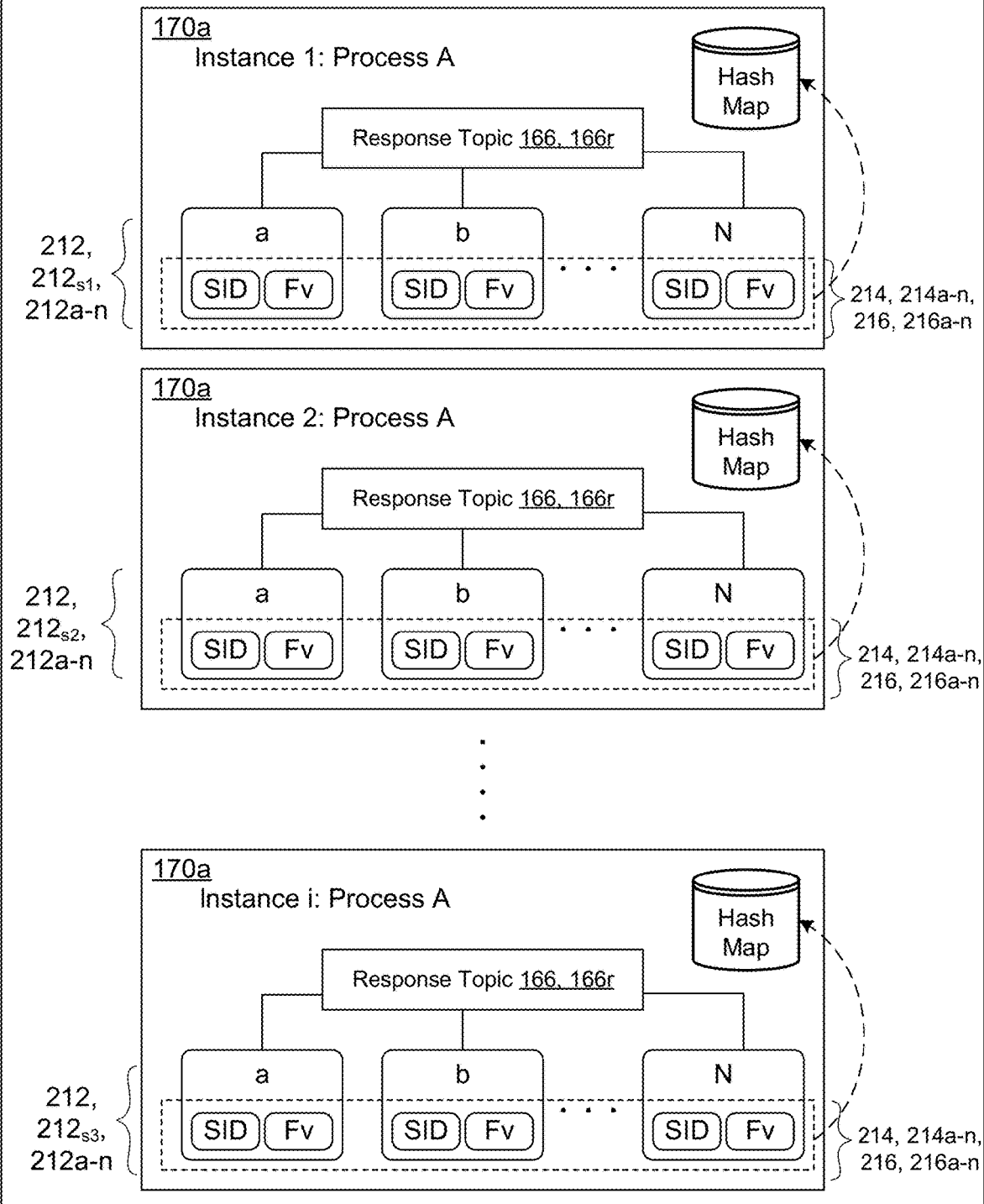
Figure 2C:
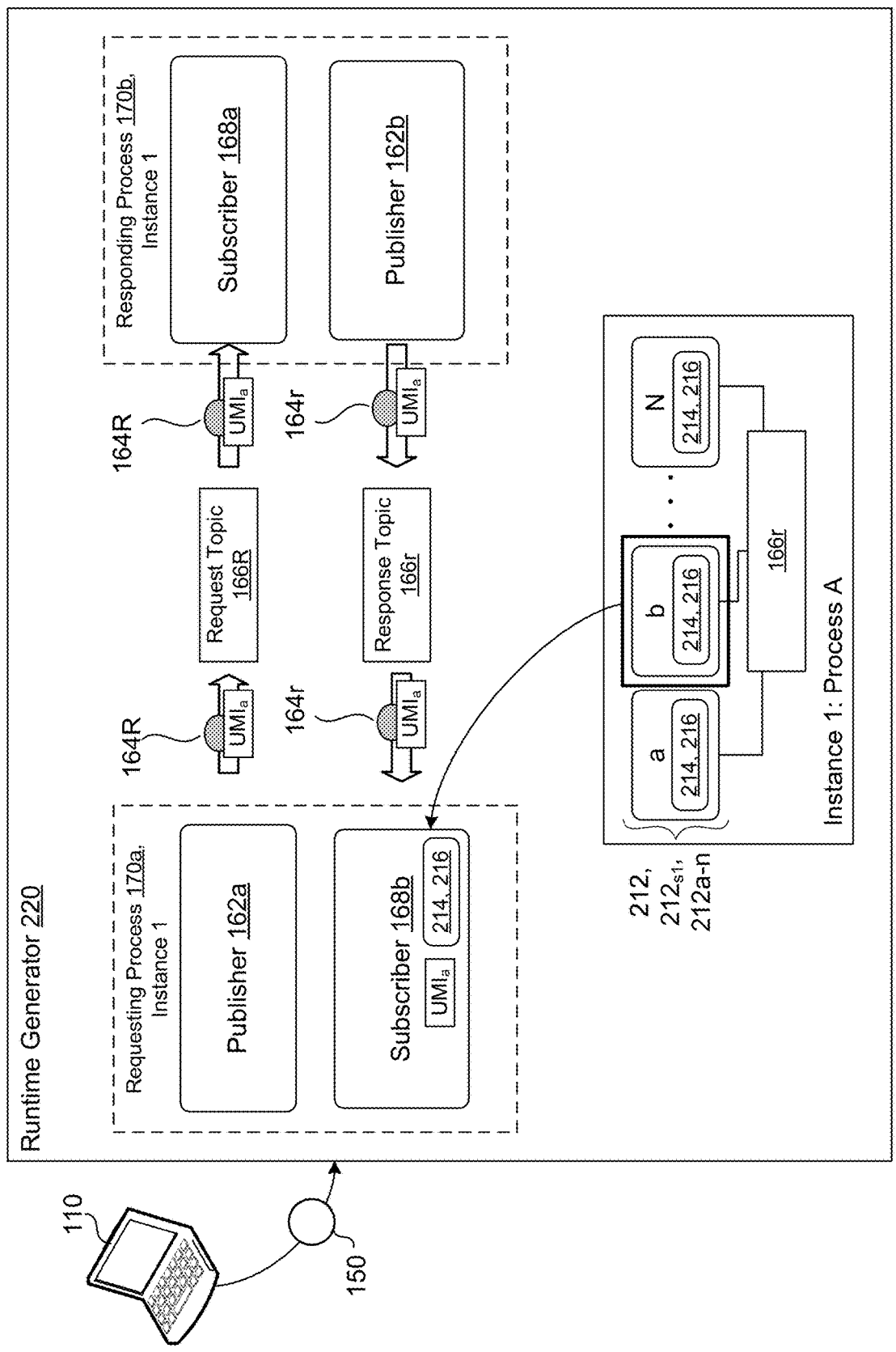

Referring to FIGS. 2A-2C, in order to setup these publisher/subscriber relationships for a process 170, the event servicer 200 performs different operations depending on whether the event service 200 is instantiating a process 170 or implementing the process 170 during runtime. In this respect, the event servicer 200 includes an initiator 210 and a runtime generator 220. The initiator 210 performs operations that occur during instantiation for a process 170 that will publish a request message 164R (e.g., that requests some action be performed by the responding process 170b). In this respect, the initiator 210 instantiates a requesting process 170. When the initiator 210 instantiates the requesting process 170, the initiator 210 identifies a topic 166 of the messaging system 150 that will receive a response message 164r from another process 170b that will respond to the request message 164R of the requesting process 170A. Here, this other process 170b is referred to as a responding process 170 since it responds to the request message 164R. The topic 166 identified by the initiator 210 is referred to as a response topic 164, 166r because it is the topic 166 to where the responding process 170b will communicate its response message 164r. In other words, since the request message 164R requests that the responding process 170b performs a particular action, the response topic 166r is a topic 166 to which the responding process 170b will publish a response message 164r that indicates the status of the action (e.g., that the action has been completed, failed, or is in some intermediate state). In some examples, the initiator 210 identifies the response topic 166r by identifying the responding process 170b that will perform the action of the request message 164R and then determining the topics 166 that this particular responding process 170b will publish to as a publisher 162.

Once the initiator 210 identifies the response topic 166r during instantiation of the requesting process 170a, the initiator 210 generates N number of subscriptions 212, 212a-n (also referred to as a plurality of subscriptions 212) to the identified response topic 166r for this particular instance of the requesting process 170a. Each subscription 212 generated by the initiator 210 for a particular instance of the requesting process 170a includes a subscription identifier 214 (shown as SID). In some examples, the subscription identifier 214 refers to a unique identifier that identifies a single subscription 212 from among the multiple subscriptions 212. In other words, one subscription 212 may not share or have a common subscription identifier 214 (e.g., in a particular instance of the requesting process 170a) with another subscription 212.

In some implementations, the initiator 210 generates each subscription 212 with a filter that waits on a filter value 216 (shown as Fv). Here, the filter value 216 may also be unique in that no other subscription 212 has the same filter value 216 as another subscription 212. The filter value 216 may be related to the subscription identifier 214 or completely separate from the subscription identifier 214. For instance, in FIG. 2B, each subscription 212a-n is shown with a subscription identifier 214 and a filter value 216. Furthermore, one or both of the subscription identifier 214 and the filter value 216 for a particular subscription 212 is also unique among all subscriptions 212 of all instances for the requesting process 170a. This means that the subscription identifier 214 and/or the filter value 216 are not shared with any other instances of the requesting process 170a so that, for example, one or the combination of the subscription identifier 214 and the filter value 216 are unique to a particular instance of the requesting process 170a. By having these elements be unique, messages 164 subscribed to by the requesting process 170a may be filtered to ensure that the messages 164, received by a subscriber 168 of a particular instance of the requesting process 170a, are intended for that particular instance of the requesting process 170a. In other words, the subscription identifier 214 and/or the filter value 216 enable the event servicer 200 to prevent data egress during runtime of the requesting process 170a.

In some configurations, the subscription identifier 214 and/or the filter value 216 corresponding to each subscription 212 are stored in a storage element such as a hashmap. For instance, when the storage element is a hashmap, the hashmap includes entries with a key-value pair where the key is the filter and the value is the subscription 212. Here, the filter that corresponds to the key may be the subscription identifier 214, the filter value 216, and/or some combination of both. The size of the storage element (e.g., the hashmap) may correspond to the number of simultaneous requests that an instance of the requesting process 170a can handle. This is because the servicer 200 may filter the messages 164 received at the response topic 166r by the filter value 216 and/or subscription identifier 214. When this is the case and these elements 214, 216 are unique to a single subscription 212, the servicer 200 can only completely prevent data egress if the filter values being used are not shared.

Referring to FIG. 2B, the initiator 210 illustrates the fact that the requesting process 170a may be instantiated countless times (e.g., shown as instance 1-i) where each instance of the requesting process 170a includes a set 212, $212_s$ of subscriptions 212, 212a-n. For instance, the first instance includes a first set 212, $212_{s1}$ of subscriptions 212a-n. The second instance includes a second set 212, $212_{s2}$ of subscriptions 212a-n. The $i^{th}$ instance includes an $i^{th}$ set 212, $212_{si}$ of subscriptions 212a-n. With multiple instances, each instance may have its own storage element for the subscription identifiers 214 and/or the filter values 216 corresponding to the respective instance's set 212s of subscriptions 212. Alternatively, the servicer 200 may include a global storage element that stores all of the subscription identifiers 214 and/or the filter values 216 corresponding to all sets 212s of subscriptions 212 (i.e., for all instances).

Referring to FIGS. 2A and 2C, after the initiator 210 performs instantiation for the requesting process 170a, the runtime generator 220 of the event servicer 200 manages how the subscriptions 212 are used during runtime for the requesting process 170a. During runtime for the requesting process 170a, the runtime generator 220 is configured to publish a request message 164R to a request topic 166R that is subscribed to by the responding process 170b. In some examples, the request message 164R corresponds to an action that a client 10 requests that the action hub 140 performs by generating a request 150. When the action hub 140 receives the request 150, the action hub 140 may provide the request 150 to the event servicer 200 to enable the event servicer 200 to identify one or more actions (e.g., event-based actions) that will fulfill the request 150. For each action identified by the event servicer 200, the event servicer 200 may generate a request message 164R that requests that a process 170 capable of performing the action associated with the request message 164R performs the action. Here, to request that a process 170 (e.g., referred to as the responding process 170b) performs the action, the requesting process 170a publishes the request message 164R to a request topic 166R that the responding process 170b subscribes to as a subscriber 168a. As a subscriber 168a, an instance of the responding process 170b receives the request message 164R and performs the action identified by or associated with the request message 164R. The responding process 170b informs the requesting process 170a that the action been completed (or some status related to the action) by, in return, publishing a response message 164r as a publisher 162b to a response topic 166r.

Since the event servicer 200 intends to prevent or to reduce data egress (e.g., with respect to subscription calls), the runtime generator 170a is configured to generate a subscriber 168b for the requesting process 170a that receives a response message 164r after the runtime generator 170a ensures that the response message 164r is truly intended for the particular instance of the requesting process 170a. To generate a subscriber 168b that receives only the response messages 164r intended for the particular instance of the requesting process 170a, the runtime generator 220 generates the subscriber 162b using a subscription identifier 214 and/or the filter value 216 of a respective subscription 212 that was instantiated by the initiator 210. In some examples, the runtime generator 220 selects (e.g., randomly selects) a subscription 212 from the set 212s of subscriptions 212 for the particular instance of the requesting process 170a and generates the subscriber 162b for the instance of the requesting process 170a with the subscription identifier 214 (and/or the filter value 216) from the selected subscription 212. For instance, FIG. 2C illustrates the runtime generator 220 selecting a second subscription 212b from the first instance of the requesting process 170a that the initiator 210 previously instantiated. With this approach, instead of generating a subscription 212 during runtime where the subscription 212 would potentially have a unique identifier for filter purposes that is specific to the request message 164R and its associated action, subscribers 168 for the requesting process 170a are generated during runtime and these subscribers 168 are generated using identifiers (e.g., the subscription identifier 214 and/or the filter value 216) that are agnostic to the specific request message 164R and the specific action of the request message 164R. Moreover, when the specific action of the request message 164 is complete and the subscriber's purpose (determining that the specific action has occurred) is done, the cloud computing environment 130 does not include an entire obsolete instance of a process 170, but rather only an obsolete subscriber 168b. The instance of the requesting process 170a that generated the obsolete subscriber 168b may continue to exist and to handle other requests by either reusing the identifier(s) 214, 216 of the obsolete subscriber 168b or by generating subscribers 168 based on other subscriptions 212 that the initiator 210 instantiated for that instance of the requesting process 170a.

In some configurations, the runtime generator 220 associates a unique message identifier UMI with the request message 164R. For example, the runtime generator 220, when it generates the request message 164R (e.g., from the request 150), also creates the unique message identifier UMI that will be included with the request message 164R. In some examples, in addition to associating the UMI with the request message 164R, the runtime generator 220 also associates or adds the UMI to the subscriber 168 that the runtime generator 220 generates to receive the response message 164r. When the subscriber 168b also includes the UMI, the runtime generator 220 has another way to ensure that the desired response (i.e., the response message 164r) from the responding process 170b is delivered by the underlying message infrastructure associated with initial request 150. In some ways, the inclusion of the UMI functions as a fail safe. That is, the subscriber 168b is already configured to filter out any messages on the response topic 166r using one or both of the subscription identifier 214 or the filter value 216. In this respect, the subscriber 168b should not receive response messages 164r that do not relate to the specific action requested by the particular instance of the requesting process 170a in the request message 164R. Yet as a fail safe, the runtime generator 220 may be configured to include the UMI to confirm that the UMI associated with the response message 164r received at the subscriber 168b is the UMI created based on the request 150 for the request message 164R. Therefore, the inclusion of the UMI enables the runtime generator 220 to generate an acknowledgement message to confirm the response message 164r (e.g., the response message 164r after being filtered) includes the UMI.

In some implementations, the requesting process 170a refers to an edge server. Here, the edge server is responsible for listening to incoming request (e.g., requests 150). The edge server therefore publishes request messages 164R based on a request 150 for a responding process 170b, such as a particular instance of an action container. In this scenario both the requesting process 170a and the responding process 170b may be stateless and single threaded processes of the remote system 130. Both of these processes 170 may scale by being replicated as multiple instances such that each instance may operate simultaneously. This means that a first request 150 may cause a first instance of the requesting process 170a to be requesting actions from a third instance of the responding process 170b while a second request 150 causes a sixth instance of the requesting process 170a to be requesting actions from a first instance of the responding process 170b.

Figure 3:
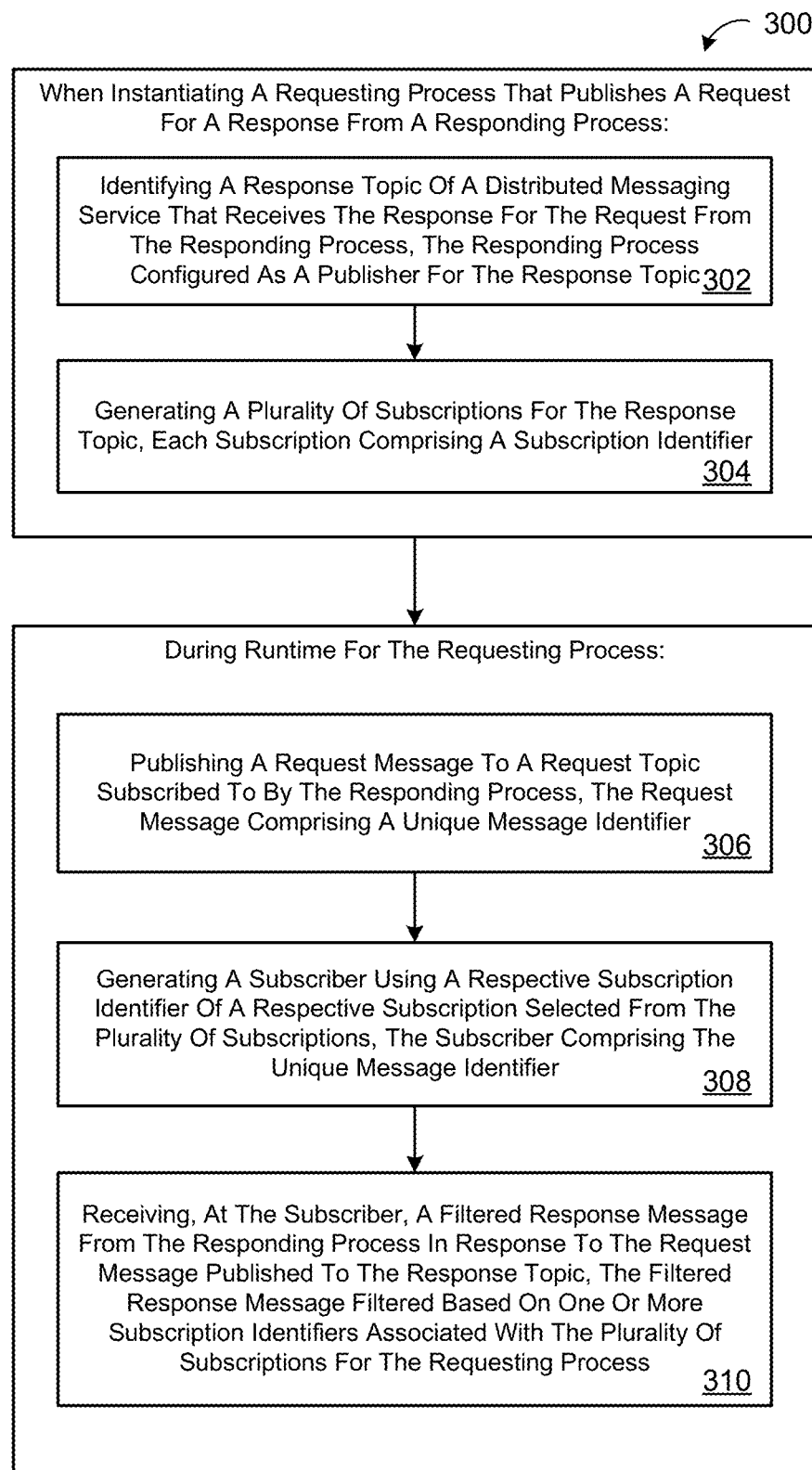
FIG. 3 is a flow chart of an example arrangement of operations for a method of implementing an event-based distributed messaging service.

FIG. 3 is a flowchart of an example arrangement of operations for a method 300 of implementing an event-based distributed messaging system. Operations 302 and 304 occur when the method 300 instantiates a requesting process 170a that publishes a request 164, 164R for a response 164, 164r from a responding process 170b. At operation 302, the method 300 identifies a response topic 166, 166r of a distributed messaging service 160 that receives the response 164, 164r for the request 164, 164R from the responding process 170b. The responding process 170b is configured as a publisher 168 for the response topic 166, 166r. At operation 304, the method 300 generates a plurality of subscriptions 212, 212a-n for the response topic 166r where each subscription 212 includes a subscription identifier 214. Operations 306-310 occur during runtime for the requesting process 170a. At operation 306, the method 300 publishes a request message 164, 164R to a request topic 166, 166R subscribed to by the responding process 170b. The request message 164, 164R includes a unique message identifier UMI. At operation 308, the method 300 generates a subscriber 168 using a respective subscription identifier 214 of a respective subscription 212 selected from the plurality of subscriptions 212, 212a-n. The subscriber 168 includes the unique message identifier UMI. At operation 310, the method 300 receives, at the subscriber 168, a filtered response message 164, 164r from the responding process 170b in response to the request message 164, 164R published to the response topic 166, 166R. Here, the filtered response message 164, 164r is filtered based on one or more subscription identifiers 214 associated with the plurality of subscriptions 212, 212a-n for the requesting process 170a.

Figure 4:
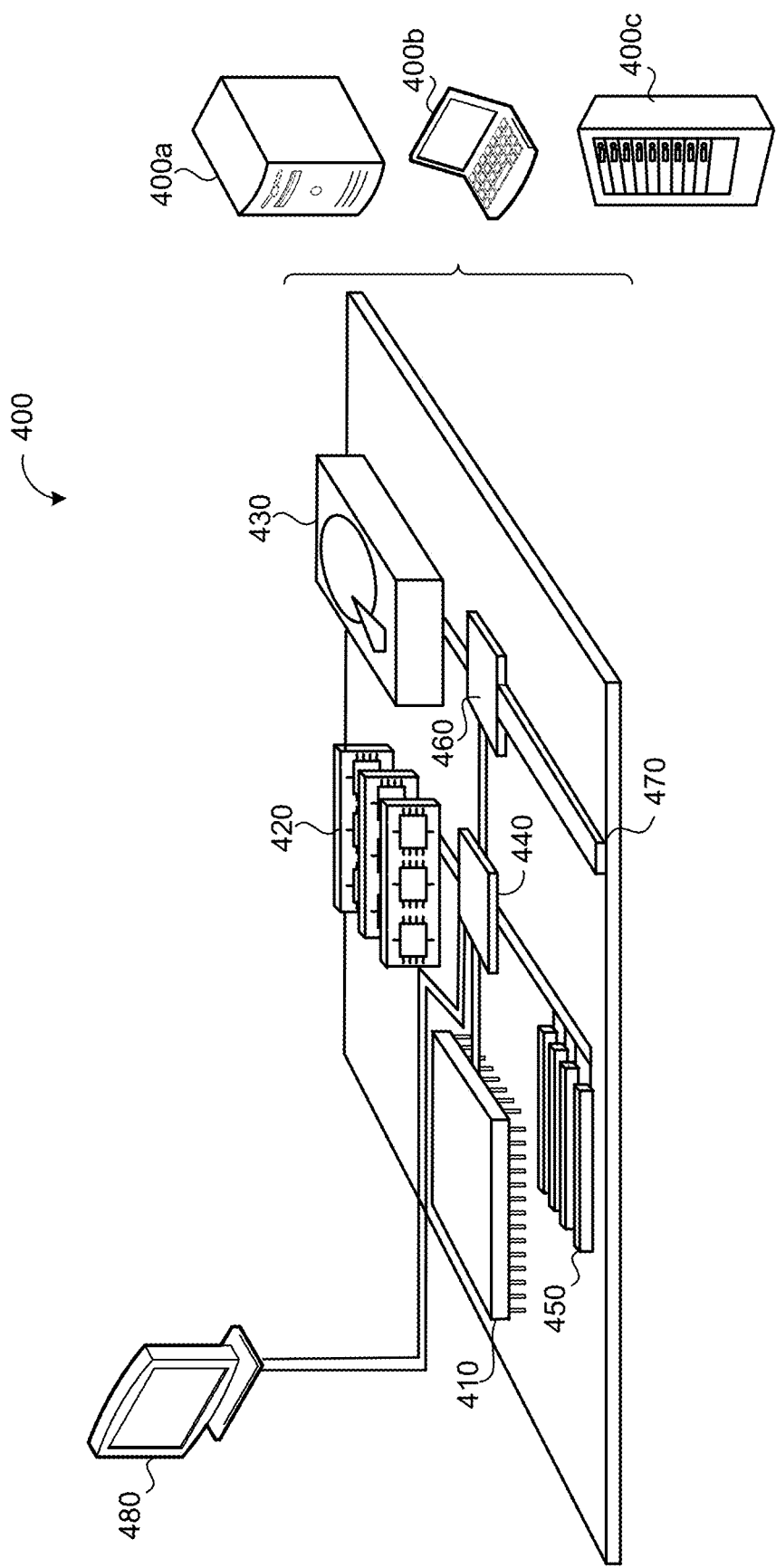
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    publishing, from a requesting process, a request message to a request topic subscribed to by a responding process, the request message comprising a unique message identifier;
    generating a subscriber comprising a subscription identifier and the unique message identifier; and
    receiving, at the subscriber, a filtered response message from the responding process in response to the request message published to a response topic, the filtered response message filtered based on the subscription identifier and the unique message identifier.

2. The method of claim 1, wherein the operations further comprise generating a plurality of subscriptions for the response topic, each subscription of the plurality of subscriptions comprising a respective subscription identifier.

3. The method of claim 1, wherein generating the subscriber comprises:
    selecting a subscription from a plurality of subscriptions; and
    generating the subscriber using the respective subscription identifier of the selected subscription.

4. The method of claim 3, wherein:
    the subscription identifier comprises a unique filter value; and
    the filtered response message is filtered based on the unique filter value of the selected subscription used to generate the subscriber.

5. The method of claim 3, wherein the operations further comprise:
    storing each respective subscription identifier of the plurality of subscriptions for the response topic at a hash map; and
    selecting the subscription by randomly selecting the respective subscription identifier from the hash map.

6. The method of claim 1, wherein the subscription identifier is unique among a plurality of instances of the requesting process.

7. The method of claim 1, wherein the operations further comprise, during runtime for the requesting process, generating the request message for the request topic.

8. The method of claim 1, wherein the requesting process is instantiated in response to receiving an initial request to perform a computing task.

9. The method of claim 8, wherein the operations further comprise, upon receipt of the filtered response message from the responding process in response to the request message published to the request topic, generating an initial response to the initial request to perform the computing task.

10. The method of claim 1, wherein the requesting process comprises an edge server.

11. A system comprising:
    data processing hardware; and
    memory hardware in communication with the data processing hardware, the memory hardware storing instructions that when executed on the data processing hardware cause the data processing hardware to perform operations comprising:
        publishing, from a requesting process, a request message to a request topic subscribed to by a responding process, the request message comprising a unique message identifier;
        generating a subscriber comprising a subscription identifier and the unique message identifier; and
        receiving, at the subscriber, a filtered response message from the responding process in response to the request message published to a response topic, the filtered response message filtered based on the subscription identifier and the unique message identifier.

12. The system of claim 11, wherein the operations further comprise generating a plurality of subscriptions for the response topic, each subscription of the plurality of subscriptions comprising a respective subscription identifier.

13. The system of claim 11, wherein generating the subscriber comprises:
    selecting a subscription from a plurality of subscriptions; and
    generating the subscriber using the respective subscription identifier of the selected subscription.

14. The system of claim 13, wherein:
    the subscription identifier comprises a unique filter value; and
    the filtered response message is filtered based on the unique filter value of the selected subscription used to generate the subscriber.

15. The system of claim 13, wherein the operations further comprise:
    storing each respective subscription identifier of the plurality of subscriptions for the response topic at a hash map; and
    selecting the subscription by randomly selecting the respective subscription identifier from the hash map.

16. The system of claim 11, wherein the subscription identifier is unique among a plurality of instances of the requesting process.

17. The system of claim 11, wherein the operations further comprise, during runtime for the requesting process, generating the request message for the request topic.

18. The system of claim 11, wherein the requesting process is instantiated in response to receiving an initial request to perform a computing task.

19. The system of claim 18, wherein the operations further comprise, upon receipt of the filtered response message from the responding process in response to the request message published to the request topic, generating an initial response to the initial request to perform the computing task.

20. The system of claim 11, wherein the requesting process comprises an edge server.

* * * * *